April 9, 1968     S. GORDON     3,376,796

APPARATUS FOR FOLDING, FORMING AND SEALING CARTONS

Filed Dec. 24, 1964     6 Sheets-Sheet 1

FIG.1

INVENTOR
SAMUEL GORDON

BY *Garvey & Garvey*
ATTORNEYS

FIG. 2

April 9, 1968           S. GORDON           3,376,796
APPARATUS FOR FOLDING, FORMING AND SEALING CARTONS
Filed Dec. 24, 1964           6 Sheets-Sheet 5

INVENTOR
SAMUEL GORDON
BY *Garvey & Garvey*
ATTORNEYS

United States Patent Office 3,376,796
Patented Apr. 9, 1968

3,376,796
APPARATUS FOR FOLDING, FORMING
AND SEALING CARTONS
Samuel Gordon, Baltimore, Md., assignor to
Gordon Cartons, Inc., Baltimore, Md.
Filed Dec. 24, 1964, Ser. No. 420,927
9 Claims. (Cl. 93—51)

ABSTRACT OF THE DISCLOSURE

Apparatus for folding and sealing cartons including a frame having a hopper secured thereto for carton blanks, at least one surface of the blanks being coated with a plastic material softened upon application of welding energy thereto, a base plate on the frame having a shaping opening, means for moving carton blanks singly from the hopper and depositing the same over the shaping opening, guide means adjacent the opening for shaping the blank to provide side and end walls with overlapping terminals, pairs of spaced electrodes below the base plate, a combination former-electrode operable to engage a carton blank on the base plate over the shaping opening and pass the guide means to set up the side and end walls of the carton with overlapping terminals, means on the frame in operative engagement with the pairs of spaced electrodes to move the latter into clamping relationship with the overlapping side and end wall terminals of the carton blank, providing an electrode adjacent each corner of the carton, a stationary conductor plate mounted on the guide means, a grounding member carried by the combination former-electrode, spring means for urging the grounding member into engagement with the conductor plate, and a dielectric generator for supplying energy in the radio frequency range, for building up molecular friction within the carton coating, and softening the coating instantly, resulting in fusion of the end wall of the carton to the overlapped end flap, to seal the carton in set-up position.

---

This invention relates to apparatus for folding, forming and sealing cartons, and paperboard packages of various miscellany having a coated surface particularly adapted for the packaging of food products.

Barrier properties have been incorporated into boxboard for making cartons, in various ways, by waxing parchment, lamination, polyethylene extrusion, foil, and other forms of lamination. More recently, these barrier coatings have been largely replaced by polyvinylidene chloride or liquid Saran latex coating, which have proven to effect better barrier properties. In connection with the folding, forming and sealing of cartons coated in the above manner, it has heretofore been necessary to set up the cartons by machinery and then secure the side and end walls thereof together by means of interlocking parts or by use of adhesives.

It is an object of this invention to provide apparatus for folding and forming coated cartons and sealing the side and end walls thereof in a single operation, erection of the cartons being effected without the use of adhesives or mechanical die-cut locks.

Another object is to provide apparatus for folding and sealing cartons coated with material softened upon application of heat thereto, the apparatus including mechanism for generating high frequency waves at the locus of the side and end wall seams, building up molecular friction stresses within the material which are manifested as heat, which softens the coating, resulting in welding of the side and end walls.

Another object of the invention is to provide a construction of carton forming and sealing apparatus in which the main element in the carton-forming operation is also common to the welding operation.

Another object of the invention is to provide a novel arrangement of welding electrodes for a carton forming and sealing apparatus in which a single electrode interior of the formed carton cooperates with separate electrodes at opposite ends of the carton.

A further object is to provide apparatus of the character described wherein the mechanism for generating high frequency waves is a dielectric generator for producing waves in the radio frequency range, the generator being connected to electrodes strategically positioned to be moved into engagement with the outer walls of the carton at points adjacent the corners thereof, the apparatus further including a combination former-electrode adapted for forcing the central portion of the carton blank downwardly to set up the walls for sealing, the former-electrode also serving as a ground connection to complete the dielectric generator circuit.

Still a further object of the invention is to provide a construction of carton folding and sealing apparatus having welding electrodes which are rugged, simple, and relatively massive in construction, which firmly hold the carton portions during the welding operation, and quickly dissipate heat from the carton weld joints.

Other objects are to provide apparatus for folding and sealing cartons in a manner to effect maximum air and moisture sealing, together with added strength and rigidity; to provide apparatus capable of welding an uncoated surface to a coated surface or two coated surfaces; and to provide apparatus susceptible of use for a variety of coatings without scorching or other damage to the carton, as set forth more fully in the specification hereinafter following, by reference to the accompanying drawings, in which:

Figure 1:
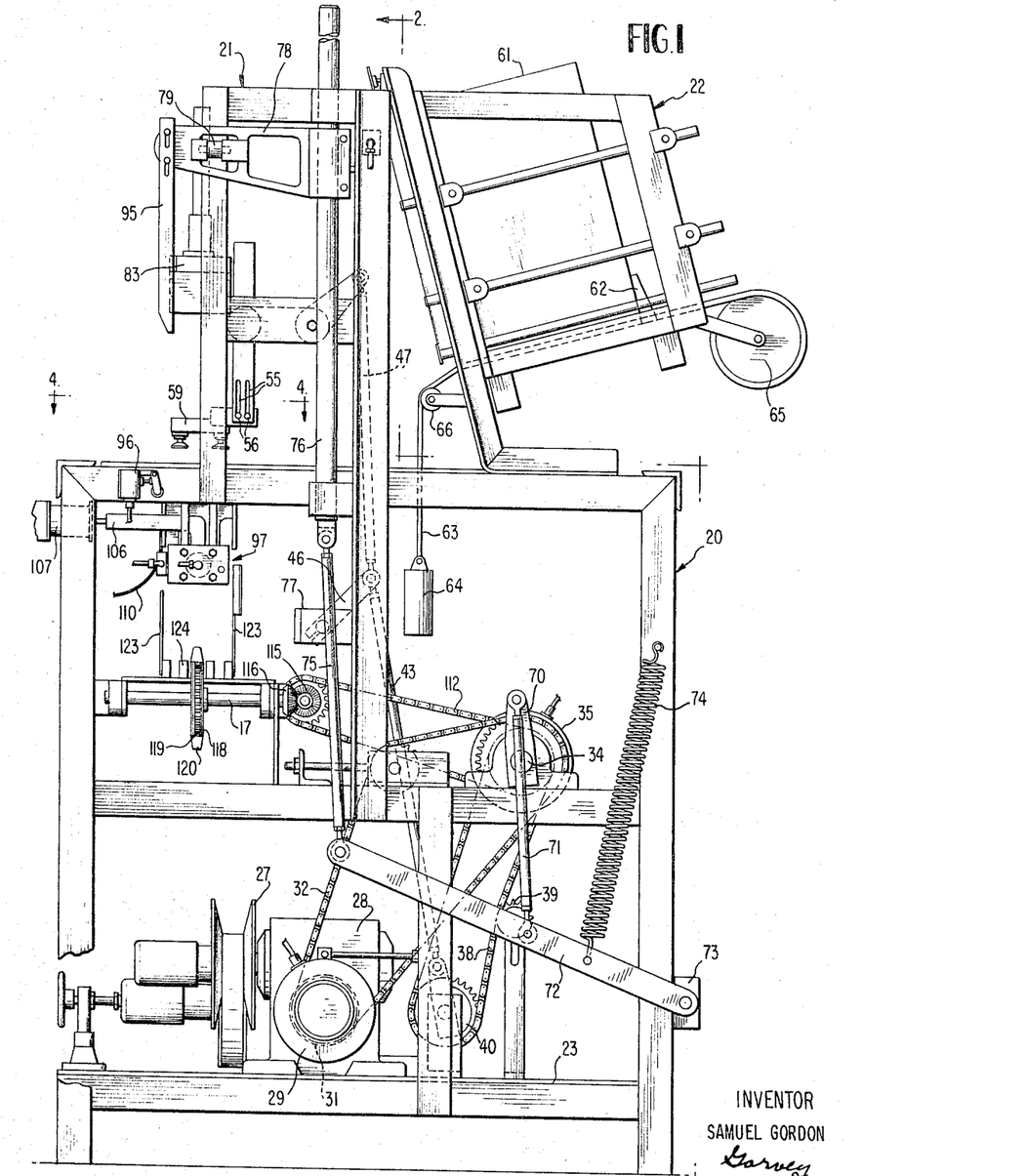
FIG. 1 is a side elevational view of apparatus for folding and sealing cartons constructed in accordance with the present invention.
Figure 2:
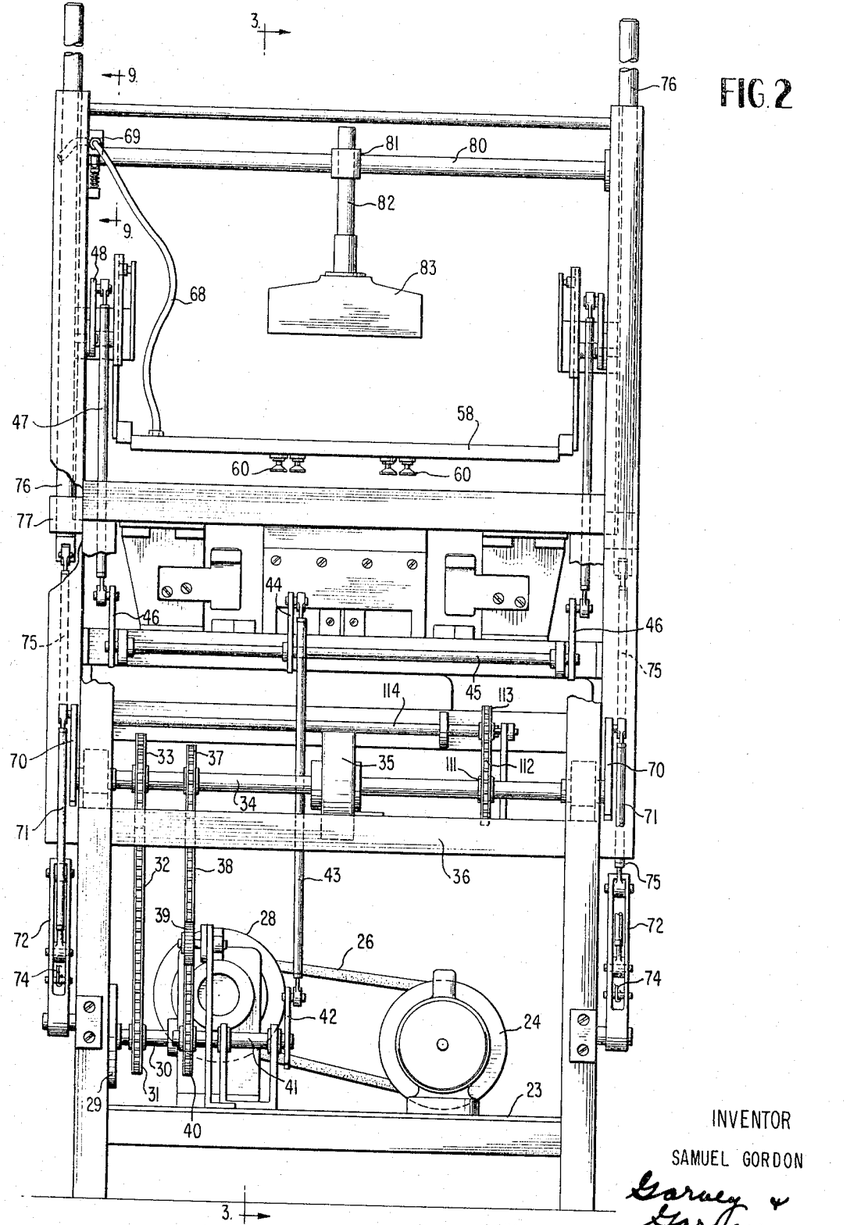
FIG. 2 is a sectional view taken along the lines 2—2 of FIG. 1, looking in the direction of the arrows.
Figure 3:
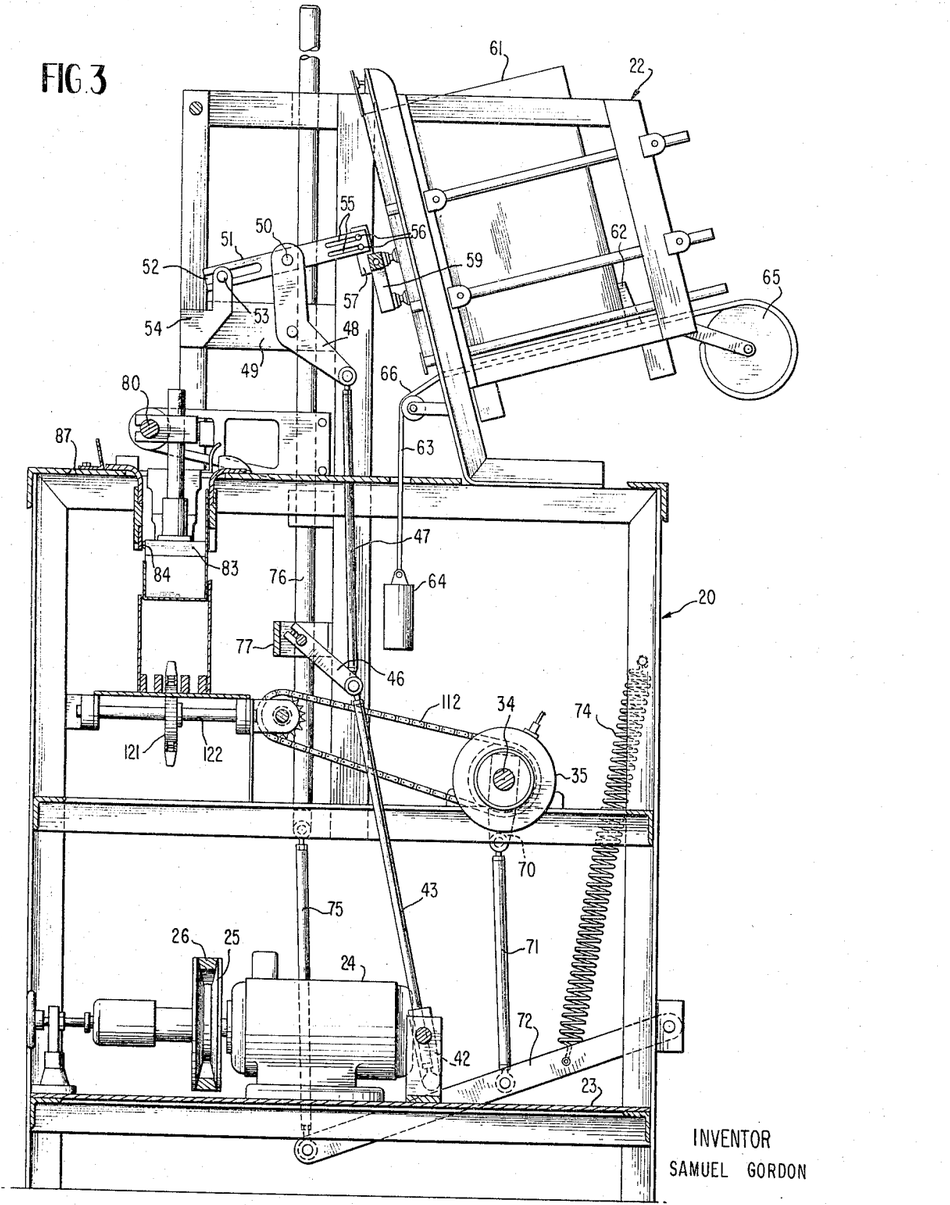
FIG. 3 is a vertical sectional view taken along the lines 3—3 of FIG. 2, looking in the direction of the arrows.

Referring now in greater detail to the drawings, there is shown in FIGS. 1 through 3, the machine of the present invention including a framework comprising a main box-like frame 20 and an auxiliary frame 21 and carton hopper 22 which are fixedly secured to the top of the main frame. A base support 23 is mounted within frame 20 on which is mounted a motor 24, which drives a variable speed pulley belt 25. A belt 26 extends from pulley 25 to a second variable speed pulley 27, in operative engagement with a transmission unit 28. Transmission unit 28 is operatively connected to an electrically operable clutch 29 which, when engaged, drives a rotatably mounted shaft 30 to which is fixed a sprocket 31. A drive chain 32 extends upwardly into engagement with a sprocket 33 which is fixed to a main drive shaft 34 extending transversely of frame 20, the terminal portions of which are suitably journaled in the frame for rotatable movement. A conventional electrically operable brake 35 is mounted on main drive shaft 34 and is fixed to an intermediate support 36 of frame 20. Adjacent sprocket 33 is another gear 37 which is also fixed to main drive shaft 34, which drives a chain 38 extending downwardly into engagement with a suitable supported idler sprocket 39 to a sprocket 40 which drives a rotatably mounted jack shaft 41. A terminal portion of a crank 42 is fixed to an end of rotatable jack shaft 41, the opposite terminal of which crank is pivotally connected to the lower extremity of an upwardly-extending arm 43 for effecting reciprocating motion of the latter. The upper terminal of arm 43 is pivoted to a terminal of a crank 44, the opposite end of which crank is fixed to an auxiliary transverse shaft 45 which is rotatably supported by frame 20. Reciprocating vertical movement of arm 43 thereby effects corresponding reciprocating rotational movement of auxiliary shaft 45. The terminals of reciprocating rotatable shaft 45 are each connected to a terminal of cranks 46 which are uniplanar with crank 44. The free terminal of each crank 46 is connected to an upwardly extending reciprocating arm 47, the upper end of which is pivoted to a terminal of a bell crank 48. The juncture of the arms comprising the bell crank are pivoted to a horizontal stationary member 49 as shown in FIG. 3. The free terminal of bell crank 48 is pivotally connected to a carton-blank-feed assembly 50 for actuating the latter upon reciprocating motion of bell crank 48.

Assembly 50 includes side members 51 to which bell crank 48 is centrally pivoted. One terminal of each side member 51 is longitudinally slotted at 52 for the reception of a guide pin 53 protruding from a mounting plate 54 which is fixed to auxiliary frame 21. The opposite terminals of side members 51 are provided with pairs of longitudinal slots 55 adapted for the reception of pins 56 to permit movement of mounting blocks 57, to which the pins are fixed. A suction cup support bar 58 extends transversely of frame 21, the terminals of which bar are fixed to mounting blocks 57. A pair of spaced suction cup supporting arms 59 extend at right angles to suction cup support bar 58. Suction cups 60 are secured to one face of bar 58, for engaging carton blanks 61 stacked in the hopper 22 when the machine is in the position illustrated in FIG. 3.

Hopper 22 is preferably angularly disposed with respect to frames 20 and 21 for optimum results and is provided with a follower plate 62 for successively urging blanks 61 into engagement with suction cups 60. Follower plate 62 exerts constant pressure on blank 61 by virtue of engagement of a sprocket chain 63, the follower plate being constantly urged in the direction of carton-blank-feed assembly 50 by a weight 64, connected to one terminal of the chain. The opposite terminal of sprocket chain 63 is fixed to a rotatably supported sprocket gear 65, while the end having the weight attached thereto extends over an idler sprocket 66.

Figure 4:
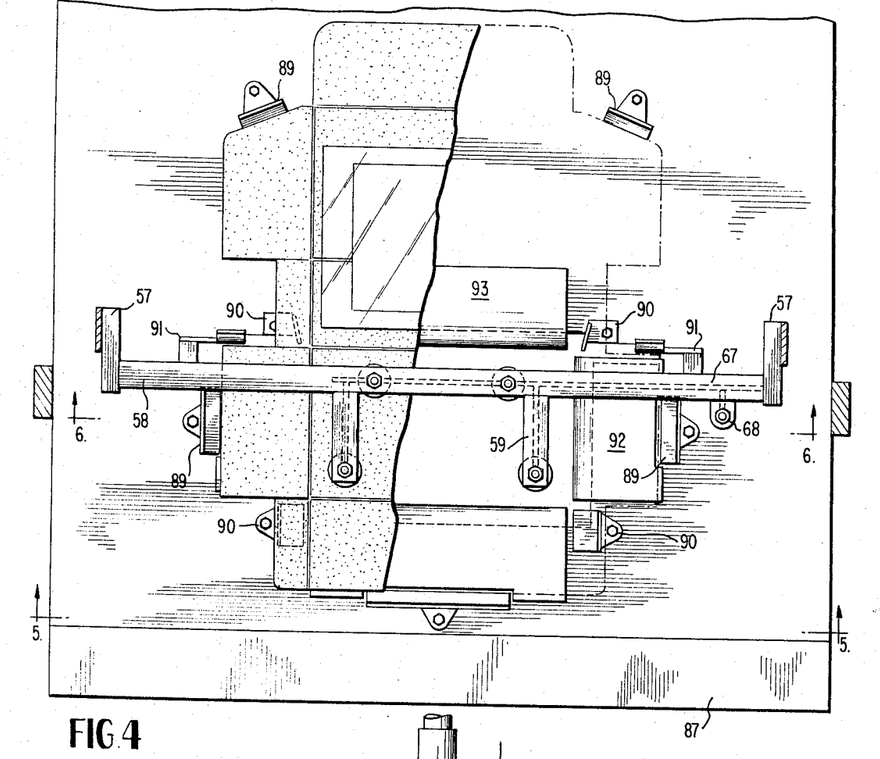
FIG. 4 is a sectional view taken along the lines 4—4 of FIG. 1, looking in the direction of the arrows.
Figure 5:
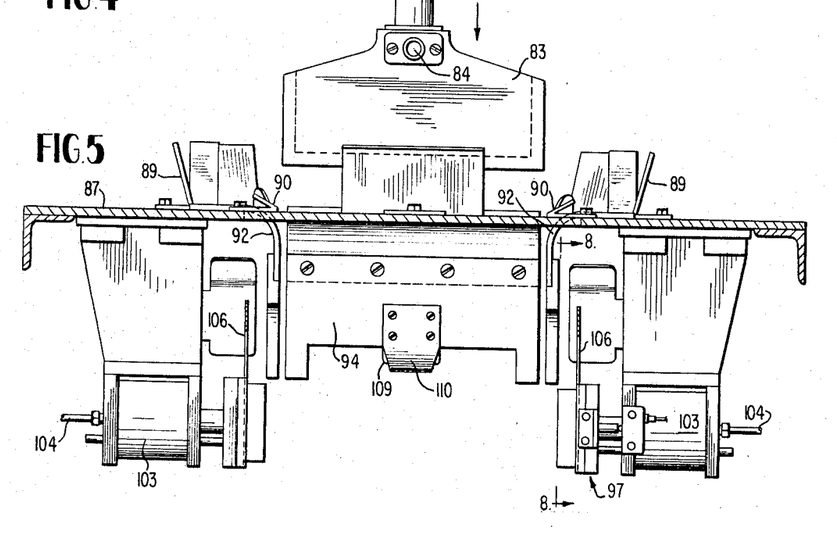
FIG. 5 is a sectional view taken along the lines 5—5 of FIG. 4, looking in the direction of the arrows.
Figure 6:
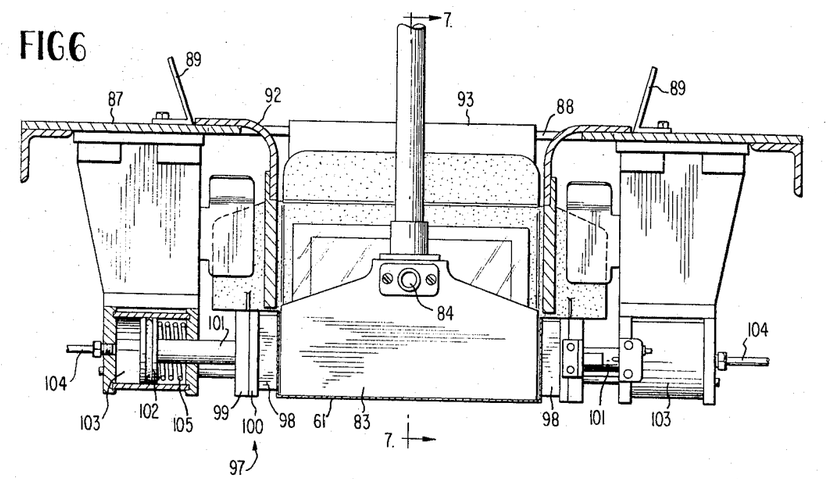
FIG. 6 is a sectional view taken along the lines 6—6 of FIG. 4, looking in the direction of the arrows.

Carton-blank-feed assembly 50 further includes means for automatically disengaging a carton blank from suction cups 60. For this purpose, suction cup support bar 58 and arms 59 are bored to provide a conduit 67 as shown in FIG. 4. Air is fed through a tube 68 into conduit 67 by a conventional vaccum pump (not shown) for exerting pneumatic pressure on the upper face of blank 61 to disengage the latter from carton-blank-feed assembly 50 when the blank is in the position shown in FIG. 4. A normally closed air control valve 69 is strategically positioned on auxiliary frame 21.

Each extremity of main drive shaft 34 is affixed to a terminal of a crank 70, the opposite end of which is pivotally joined to an arm 71 which extends downwardly into pivotal engagement with the central portion of an actuating arm 72. An end portion of actuating arm 72 is pivoted to a stationary mounting 73 which is fixed to frame 20. A tensioning spring is indicated at 74. The opposite end of actuating arm 72 is pivoted to a connecting arm 75 which extends upwardly into pivotal engagement with a guide rod 76. Each guide rod 76 extends through spaced sleeves 77 affixed to frame 21 for reciprocating synchronous vertical movement of the guide rods.

Figure 9:
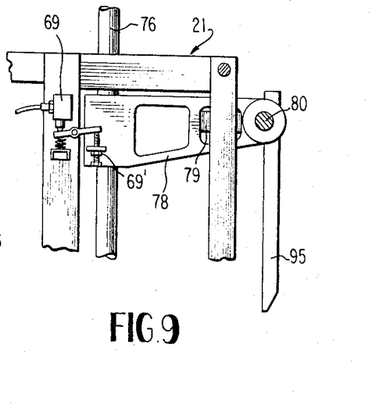
FIG. 9 is a sectional view taken along the lines 9—9 of FIG. 2, looking in the direction of the arrows.

Opposed brackets 78 are secured to guide rods 76 in any suitable manner, the brackets being provided with roller means 79 in journals for engagement and relatively longitudinal movement with respect to vertical members of frame 21. One of said brackets is provided with a suitable trip means 69' positioned to actuate air control valve 69 of the carton feed assembly when the bracket is raised to its uppermost position, as illustrated in FIG. 9, that is, when the mechanism is in the position shown in FIGS. 1 and 2, at which time the carton blank is disposed in the horizontal position.

A cross bar 80 connects brackets 78 and is suitably supported therein. A collar 81 is fitted on a central portion of cross bar 80 in which is secured a depending rod 82, the lower portion of which holds a combination carton-former and ground-electrode 83, forming a salient part of the present invention. The combination former-electrode is of a configuration conforming to the bottom, side and end walls of the carton to be formed.

Figures 7, 8:
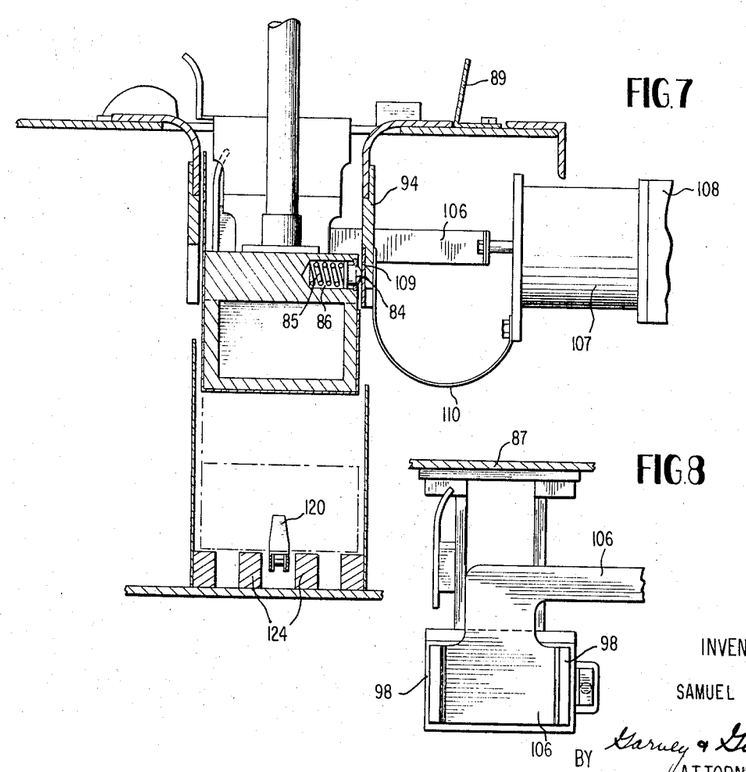
FIG. 7 is a sectional view taken along the lines 7—7 of FIG. 6, looking in the direction of the arrows.
FIG. 8 is an enlarged fragmentary elevational view of a pair of electrodes for sealing cartons in accordance with the present invention.

In accordance with the present invention, the combination former-electrode is made of a conducting material, preferably metal, and is provided, at a point near its upper extremity, with a grounding button 84 of suitable conducting material, normally urged outwardly by a coil spring 85 located in a recess 86, as shown to advantage in FIG. 7.

In conjunction with combination former-electrode 83, the present apparatus further includes a head plate 87 extending transversely of and fixed to the top of frame 20 which is adapted to receive each carton blank 61 in a horizontal position. Head plate 87 is provided with a cavity or shaping opening 88 in the path of movement of former-electrode 83. Conventional means are secured to head plate 87 to effect proper positioning of the carton blank for the folding thereof to form the carton. These parts include registers 89, flap folders 90 and deflectors 91. Additionally, there are provided first folders 92 and second folders 93 to effect proper setting up of the carton as the blank is pushed from a flat horizontal position through the head plate cavity by the former-electrode 83. Beneath head plate 87, carton wall guides 94 extend downwardly from the lower terminals of first and second folders 92 and 93.

One bracket 78 is provided with a trip arm 95 adapted to actuate a micro-switch 96 affixed to frame 20 upon downward movement thereof, to actuate the carton sealing assembly forming a salient feature of the present invention.

The carton-sealing assembly is generally designated 97 and is adapted to coact with carton-former ground-electrode 83. As shown to advantage in FIGS. 6, 7, 8 and 10, the assembly includes spaced pairs of electrodes 98 in opposed predetermined spaced relationship, mounted on a support member 99 and spaced therefrom by a suitable insulator 100 constructed of Teflon or the like. Support member 99 and its connected parts are fixed to the end of a piston rod 101 having a head 102 mounted in an air cylinder 103. Air is fed under pressure into air cylinder 103 through an air tube 104, for forcing electrodes 98 into their maximum inward position towards combination former-electrode 83 between which are interposed the walls of the blank 61 being formed into a carton. Both air cylinders are actuated simultaneously. A compression spring 105 within air cylinder 103, which is compressed by head 102 when air enters the cylinder, serves to urge the electrodes 98 out of engagement with the side walls of the carton being formed upon release of air pressure from the cylinder.

Electrodes 98 are positioned to engage the end walls of the carton at points proximate the corners thereof and/or at other selected points. Each pair of spaced electrodes is electrically connected to a conducting metallic strip 106, the metallic strip being connected through a coaxial conductor member 107 to a dielectric generator 108 of conventional construction, such as Model C30–SP operating at 2.5 kilowatts, manufactured by Reeve Electronics, Chicago, Ill. For purposes of the present invention, dielectric generator 108 is operated in the radio frequency range, such as for example, at 27 megacycles. In order to effect sealing in accordance with the present invention, blanks 61 are coated on at least one side, with material melted, or softened, upon application of high frequency energy thereto, such as a liquid Saran latex coating.

As shown to advantage in FIG. 7, ground button 84 of combination former-electrode 83 is adapted to engage a conductor plate 109, mounted on a guide 94, during its downward travel to complete the ground circuit of the welding circuit before electrodes 98 are energized. Plate 109 is connected to electrical ground through conductor 110.

It is further in accord with the present invention to provide means for automatically removing the sealed cartons from the machine. For this purpose, a sprocket member 111 is secured to main drive shaft 34 for driving a sprocket chain 112 which is in operative engagement with a sprocket 113 as shown in FIG. 2. Driven sprocket 113 in turn, actuates a shaft 114 to which is engaged melting bevel gears 115 and 116. Bevel gear 116 in turn rotates a rod 117 having a sprocket 118 affixed thereto, on which is mounted a sprocket chain 119 having upstanding lugs 120. Sprocket chain 119 extends to an idle sprocket 121 supported on a rotatable shaft 122. Wall guides are indicated at 123. As the formed and sealed cartons are deposited on supporting member 124 extending in parallel longitudinal relationship with sprocket chain 119, they are pushed by upstanding lugs 120 in the direction of movement of the chain to a point exterior of the machine for use.

OPERATION

Figure 11:
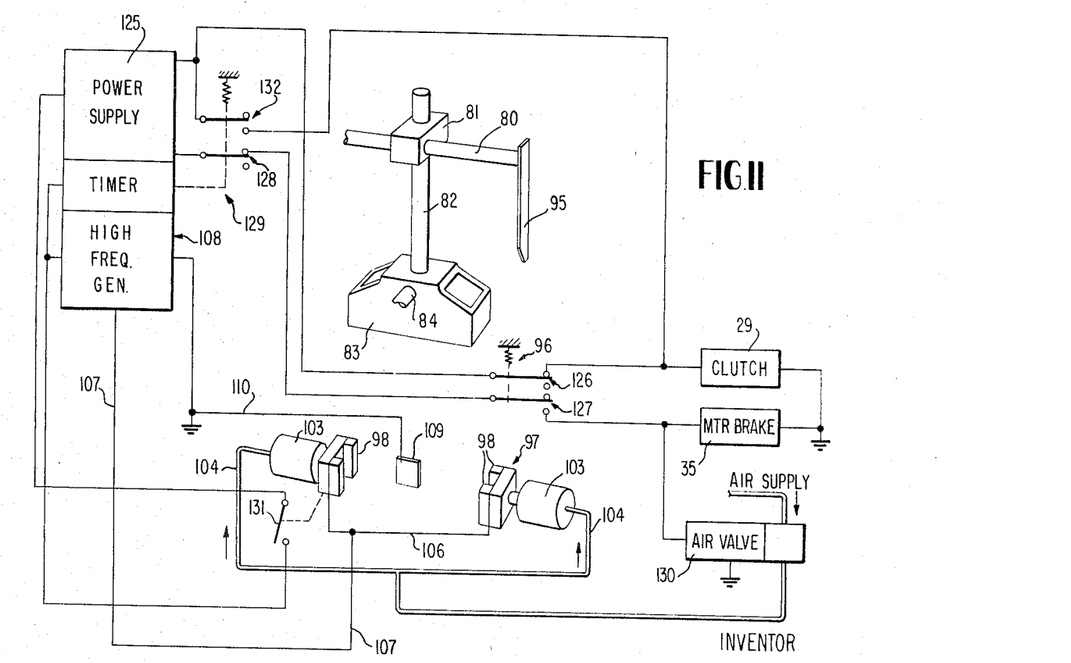
FIG. 11 is a schematic diagram of the electrical welding and timing circuit of the present invention.

In operation, coated carton blanks 61 of pre-cut design and scored along predetermined lines are positioned in hopper 22 and follower plate 62 engaged with the rear thereof to exert continuous pressure on the blanks in the direction of carton-blank feed assembly 50. At this time, the machine is in the position illustrated in FIG. 3, with electrical clutch 29 engaged and electrical brake 35 inoperative, as schematically shown in FIG. 11. Clutch 29 is energized from the power supply section 125 of high frequency generator 108 through the normally closed contacts 126 of micro-switch 96. The normally open contacts 127 of the micro-switch maintain the electrical brake 35 de-energized. Motor 24 is energized at this time and initiates rotation of main drive shaft 34 by drive chain 32, thereby effecting upward movement of arm 43 and partial rotation of auxiliary transverse shaft 45. This causes reciprocating arms 47 to be pushed upwardly, thereby causing a corresponding upward movement of one end of bell cranks 48. This, in turn, effects a pivotal movement of bell cranks 48 about their pivotal connection with horizontal stationary members 49, a sliding movement of guide pins 53 in longitudinal slots 52 of side members 51 and arcuate movement of suction-cup support bar 58. By virtue of the engagement of suction cups 60 with proximate carton blank 61, a single blank is swung downwardly, to a horizontal position, to a point superjacent head plate 87 with that portion of the blank which is to form the bottom wall of the carton, disposed over cavity 88.

While this is taking place, the combination former-electrode 83 is being moved upwardly, out of the path of carton-blank feed assembly 50. When brackets 78 reach their uppermost point, trip means 69' opens air control valve 69, thereby permitting air to flow through tube 68 and conduit 67 of suction-cup support bar 58 and suction-cup arms 59. The air is then emitted at the locus of suction cups 60 downwardly against the blank, to overcome the retaining force of the suction cups and deposit the blank on head plate 87, as shown at FIG. 4. Air control valve 69 is closed upon initiation of the immediately succeeding downward movement of brackets 78.

During the above-described movement of carton-blank feed assembly 50, the rotation of main drive shaft 34 is effecting an upward movement of connecting arms 75 and guide rods 76 to raise brackets 78 and the connected combination former-electrode 83. FIGS. 1 and 2 illustrate the former-electrode mechanism in its raised position.

The next phase of the operation then begins with the movement of the arms 43 and 47 in a downward direction, by virtue of the various crank arms connected to these parts, thereby effecting a corresponding rotational movement of bell cranks 48 about their pivots to return the carton-blank feed assembly to its initial position, as shown in FIG. 3. At the same time, connecting arms 75 and guide rods 76 are being moved downwardly until the lower face of combination former-electrode 83 engages the bottom wall portion of blank 61, forcing it downwardly, through cavity 88, past the various folding elements, to set up the side and end walls of the carton in a manner well known in the art.

As the former-electrode 83 reaches the bottom of its downward travel and the carton is completely set up, trip arm 95, depending from one of brackets 78, which moves with former-electrode 83, actuates micro-switch 96 to set in operation, the sealing mechanism of the present invention.

Figure 10:
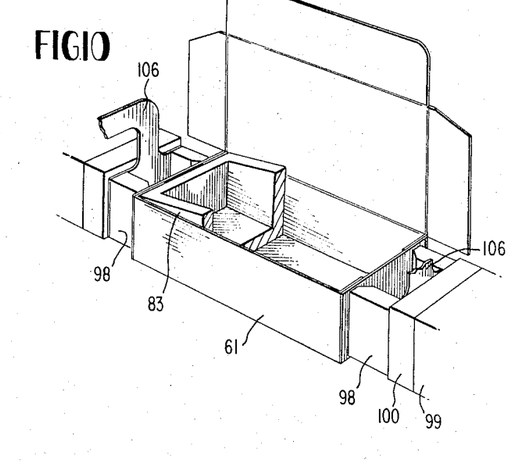
FIG. 10 is a fragmentary pespective view of the sealing assembly forming a salient part of the present invention and illustrating its application.

Referring now to FIG. 11, it will be seen that actuation of micro-switch 96 opens normally closed contacts 126 thereof, opening the clutch-energizing circuit, thus effecting disengagement of clutch 29, thereby ceasing rotation of main drive shaft 34 and movement of its connected parts. At the same time, normally open contacts 127 of the micro-switch are closed to complete a circuit from power supply 125 through the normally closed series-connected contacts 128 of timer switch 129 in the high frequency generator, thus energizing brake 35, to halt the downward movement of combination former-electrode 83 in the operative position shown in FIG. 6. The closing of micro-switch contacts 127 upon activation of micro-switch 96 also simultaneously energizes air valve 130 to open the same and cause air to flow under pressure through air tube 104 to air cylinders 103. This effects movement of piston heads 102 against the tension of springs 105 with resultant inward movement of electrodes 98 into contiguous engagement with the end walls of carton blank 61 at the locus of the carton corners. As shown in FIG. 10, these electrodes preferably are of substantial width and height to effect sealing of a large area of the end walls to inner flaps thereof, and are relatively massive in construction, as is former-electrode 83, so that any heat at the weld joint is quickly dissipated. At this time, it will be seen from FIGS. 6 and 10, that electrodes 98, carton blank 61 and combination former-electrode 83 are in tight engagement, with no air gaps between the parts, so that the parts are firmly held in position during the welding operation.

Movement of electrodes 98 inwardly into operative position simultaneously closes micro-switch 131 which is spring-loaded to move to the closed position as the electrodes move away therefrom. This completes a circuit from power supply 125 to simultaneously energize the high frequency dielectric generator 108 and the timer switch 129, which is a portion thereof. Energization of dielectric generator 108 causes passage of high frequency energy in the radio frequency range through coaxial conductor 107 and metallic conductor strips 106, to electrodes 98. The rapidly alternating high R.F. voltage field builds up molecular friction stresses within only the Saran latex coating, or the like, on blank 61, which are manifested as heat. The coated surface layer of the blank is thereby melted or softened instantly, resulting in fusion or welding of the end wall of the carton to the overlapped end flap, to seal the carton in set-up position. The sealing action takes place in a fraction of a second, thereby precluding any danger of scorching of the blank, and as previously indicated, the weld joints are immediately cooled by conduction of heat away from the joints by the massive electrodes 83 and 98, which remain substantially cool during the entire operation. The Saran latex coating, or the like, flows into adhesion with the adjacent layer to such an extent that when the carton is pulled part, the fibers or the like of the opposite layer are broken.

In accordance with the present invention, former-electrode 83 is the ground electrode during the sealing or welding step, by virtue of engagement of spring-actuated button 84 with conducting plate 109 which, in turn, is connected to electrical ground through member 110 (see FIG. 7).

Timer switch 129, of dielectric generator 108, is of the type which is actuated a predetermined time interval after an energization signal is applied thereto, and then returns to its normal de-energized position, as shown in FIG. 11, a predetermined time after the energizing signal is removed. Timer switch 129 is energized at the same instant generator 108 is energized and the welding operation begins. At the end of its first predetermined time interval, the timer switch pulls in its contacts, moving its normally closed contacts 128 to the open position and its normally open contacts 132 to the closed position. Contacts 128 are in series with the energizing circuit of electrical brake 35 and air valve 130 and when moved to the open position, break this circuit to close air valve 130, thus removing pressure from cylinders 103 and effecting movement of electrodes 98 away from the set-up carton and former-electrode 83 under urging of springs 105. Upon movement of electrodes 98 toward their normal positions, micro-switch 131 is opened, de-energizing high frequency generator 108 and the timer switch portion 129 thereof.

Electrical brake 35 is de-energized to disengage the same and timer switch contacts 132 simultaneously complete a circuit from the power supply to electrical clutch 29 to energize and engage the latter, to enable main drive shaft 34 to again rotate accompanied by movement of its conected parts. This results in former-electrode 83, brackets 78 and trip arm 95 moving upwardly, allowing microswitch 96 to return under spring action to its normal position to open the brake and air valve energizing circuit, and contacts 126 return to the normally closed position to complete the energizing circuit of clutch 29. At this time, there are two energizing circuits for clutch 29 completed through contacts 126 and 132 respectively. However, shortly after micro-switch 96 returns to its normal position, the second predetermined time interval of timer switch 129 lapses and contacts 128 and 132 return to the normal positions shown in FIG. 11.

As electrodes 98 retract, the set-up carton will drop, either under force of gravity or be pushed downwardly by the succeeding carton in the next cycle of operation, onto supporting members 124, where it is engaged by an upstanding lug 120 carried by moving sprocket chain 119. The lateral movement of the lug pushes the set-up carton out of the machine for collection and use.

As former-electrode 83 moves upwardly, suction cups 60 engage and pick up the next succeeding carton blank 61 in feed assembly 50 and proceeds to deposit it on head plate 87 in the same manner as previously described. The operation of the apparatus thus continuously repeats itself to produce set-up welded cartons at a substantially fast rate.

While the invention has been described in certain preferred embodiments, it is realized that modifications can be made without departing from the spirit of the invention and it is to be understood that no limitations upon the invention are intended, other than those imposed by the scope of the appended claims.

I claim:

1. Apparatus for folding and sealing cartons including a frame, a hopper secured to said frame, carton blanks in said hopper, at least one surface of which blanks are coated with a plastic material softened upon application of welding energy thereto, a base plate mounted on said frame and provided with a shaping opening, means for moving carton blanks singly from said hopper and depositing the same over the shaping opening, guide means adjacent the shaping opening for automatically shaping the blank to provide side and end walls with overlapping terminals, pairs of spaced electrodes below said base plate, a combination former-electrode operable to engage a carton blank on the base plate over the shaping opening and past said guide means to set up the side and end walls of the carton with overlapping terminals, a stationary conductor plate mounted on said guide means, a grounding member carried by said combination former-electrode, spring means for urging said grounding member into engagement with said conductor plate, said former-electrode and blank being movable to a point intermediate said pairs of spaced electrodes, means on said frame in operative engagement with said pairs of spaced electrodes to move the latter into clamping relationship with the overlapping side and end wall terminals of the carton blank, thereby providing an electrode adjacent each corner of the carton, and means for simultaneously generating welding energy between said pairs of spaced electrodes to instantaneously soften the plastic coating of the blank at the locus of the pairs of electrodes, to weld together the overlapped side and end wall terminals, said means for moving the pairs of electrodes into clamping relationship with the side and end wall terminals being adapted to move the pairs of electrodes away from said former-electrode to complete the welding operation.

2. The apparatus of claim 1 with the addition of a conveyor for receiving the folded and sealed cartons and directing the same to a point external of the apparatus.

3. The apparatus of claim 1 wherein each electrode in clamping relation with an overlapping side and end wall terminal of the carton blank extends through a substantial portion of the carton's height to effect sealing of a large surface area of the overlapping side and end wall terminals.

4. The apparatus of claim 3 wherein said combination former-electrode is of substantially the same planar size as the carton formed thereby and thereon.

5. The apparatus of claim 1, wherein said means for generating welding energy comprises a dielectric generator operated at approximately 27 megacycles.

6. Apparatus for forming a carton coated on at least one side with a thermoplastic coating into a carton having side walls and end walls, the terminals of the side walls and end walls being contiguous; the apparatus including a combination carton former and electrode, stationary guide means positioned adjacent said combination carton former and electrode, the latter being adapted to engage a carton blank and being movable relative to said guide means to form a carton thereabout, pairs of spaced electrodes, means for moving said spaced electrodes inwardly in a plane substantially at a right angle to the plane of movement of said combination carton former and electrode, said spaced electrodes moving into clamping relationship with the overlapping side and end wall terminals of the carton blank, high frequency energy means in circuit with said combination corton former and electrode and said spaced electrodes for building up molecular friction within the carton coating, and softening the coating instantly, resulting in fusion of the end walls of the carton to the overlapped end flaps, to seal the carton in set-up position, a stationary conductor plate mounted on said guide means, said conductor plate being connected to an electrical ground, and means carried by said combination former and electrode for engagement with said conductor plate, for completing the ground circuit before said spaced electrodes are energized by said high frequency energy means.

7. The apparatus of claim 6, wherein said high frequency energy means comprises a dielectric generator operated in the radio frequency range.

8. The apparatus of claim 7, wherein said dielectric generator is operated at approximately 27 megacycles.

9. The apparatus of claim 6, wherein said means carried by said combination former and electrode comprises a member extending outwardly from a wall of said combination former and electrode, and spring means engaged with said member for normally urging said member to its extended position.

References Cited

UNITED STATES PATENTS

| | | | |
|---|---|---|---|
| 2,535,413 | 12/1950 | Hart et al. | 93—49 |
| 2,585,013 | 2/1952 | Odquist | 93—55.1 |
| 3,063,348 | 11/1962 | Simpson | 93—51 |
| 3,085,479 | 4/1963 | Hoyrup et al. | 93—51 |
| 3,142,601 | 7/1964 | Polk et al. | 264—26 |
| 2,806,116 | 9/1957 | Hoagland | 219—10.81 X |
| 2,818,484 | 12/1957 | Sevison | 219—10.53 |

FOREIGN PATENTS

| | | |
|---|---|---|
| 881,973 | 11/1961 | Great Britain. |
| 1,360,570 | 3/1964 | France. |
| 900,118 | 7/1962 | Great Britain. |

WILLIAM W. DYER, JR., *Primary Examiner.*

FRANK E. BAILEY, *Examiner.*

N. ABRAMS, *Assistant Examiner.*